United States Patent [19]

Glaser

[11] 4,258,108

[45] Mar. 24, 1981

[54] LEAK-PROOFING OF BUTTON CELLS

[75] Inventor: Helmut Glaser, Singapore, Singapore

[73] Assignee: Varta Batterie, A.G., Am Leineufer, Fed. Rep. of Germany

[21] Appl. No.: 139,744

[22] Filed: Apr. 14, 1980

[30] Foreign Application Priority Data

May 16, 1979 [DE] Fed. Rep. of Germany ....... 2919716

[51] Int. Cl.³ .............................................. H01M 2/08
[52] U.S. Cl. ................................... 429/162; 429/174; 429/185
[58] Field of Search ............... 429/174, 185, 173, 184, 429/86, 122, 162, 164

[56] References Cited

U.S. PATENT DOCUMENTS

| 3,623,915 | 11/1971 | Pun et al. ........................ 429/173 X |
| 3,713,896 | 1/1973 | Feldhake ............................. 429/174 |
| 3,891,463 | 6/1975 | Karobath et al. .................... 429/173 |
| 3,990,918 | 11/1976 | Bro et al. ............................ 429/185 |
| 4,011,371 | 3/1977 | Hallett et al. ....................... 429/174 |
| 4,064,329 | 12/1977 | Naylor ................................. 429/174 |
| 4,122,241 | 10/1978 | Ciliberti, Jr. et al. .......... 429/185 X |

*Primary Examiner*—Anthony Skapars
*Attorney, Agent, or Firm*—Weiser, Stapler & Spivak

[57] ABSTRACT

Galvanic elements of button cell type are sealed against electrolyte escape by positioning a hydroxide binding material between the housing cup and the lid on that side of the synthetic plastic seal which is normally sealed off from contact with the electrolyte. This material can be positioned within a ring of matting which is protected from moisture by a coating of lacquer or a shrink tube. The hydroxide binding material for which solids such as $B_2O_3$, $As_2O_3$ or acid salts such as $NaH_2PO_4$, $Na_2H_2P_2O_7$ may be used, may also be positioned in encircling grooves provided in the sealing body itself.

10 Claims, 3 Drawing Figures

LEAK-PROOFING OF BUTTON CELLS

The invention relates to a galvanic element, and particularly a button cell, having an alkaline electrolyte in a metal housing which is closed in gas-tight manner by means of a synthetic plastic seal between the housing cup and the lid.

Alkaline button cells, and particularly those of rechargeable Ni/Cd type, are frequently used in applications in which, unlike in the customary use in flashlights, flashguns or electric shavers, there is required a useful life of five years or more. An illustrative application is found in printed circuits, to which the button cells are fixedly soldered, so that they are difficult to replace if defective.

In such cases, the known creepage of the KOH electrolyte becomes a serious problem because the customary synthetic plastic seals are not capable of insuring resistance to electrolyte escape from the cell, at least not over a period of years.

Experience has also shown that mechanical seals, even though they deserve the designation of "gas-tight", are frequently not equal to the simultaneous requirement of hydroxide tightness. In order to nevertheless meet this requirement it is obvious to use instead of the KOH electrolyte the less creepy sodium hydroxide or even to reduce the quantity of electrolyte.

From U.S. Pat. No. 3,891,462 it is known to enclose a miniature button cell which is itself gas-tight within a larger sealed housing. U.S. Pat. No. 4,011,371 further teaches neutralization of the acid electrolyte which may escape from a lithium cell which is no longer sealed. There one utilizes a special structural embodiment of the sealing region between cell cup and lid.

However these measures are inconvenient and cause the rated capacity of the cell to diminish, either with respect to the capacity determined by volume, or with respect to peak current load capacity.

Accordingly it is an object of the invention to seal commercial and conventional alkaline button cells against electrolyte escape without significant structural modifications.

This and other objects which will appear are achieved in accordance with the present invention by providing a hydroxide binding material on the side of the sealing region which faces away from the electrolyte.

In particular, this is accomplished by introducing the hydroxide binding material into that outer region of the sealing area in which it is normally precluded from all contact with the electrolyte. This can be accomplished by immersing the button cell in a solution of a acidly reacting material, which, after crystallization, can easily be wiped from bare surfaces of the cell but which remains behind in the ring-shaped sealing region, and there is held in place by means of a synthetic lacquer. In principle it is also possible to apply the hydroxide binding material to the seal in the form of a paste.

Independently of the method of application, it is possible to provide the interior of the housing cup in the region of the crimped edge or the ring-shaped synthetic plastic seal itself, with encircling grooves or slots, in which the hydroxide binding material is received prior to crimping.

It is particularly advantageous to apply to the sealing region from the outside a ring stamped out of matting which has previously been saturated, for example, with a boric acid solution, and then dried. The pores of the matting are then filled with crystallized boric acid. In addition a powdered hygroscopic material can be introduced into the pores.

To attach the matting ring, it is pressed against the sealing surface by means of shrink tubing, and the neutralizing material is thereby simultaneously protected from external moisture. Similar protection can of course also be obtained by lacquer treatment, or by encasing the whole cell in synthetic resin.

For further details reference is made to the discussion which follows in light of the accompanying drawings wherein.

Figure 1:
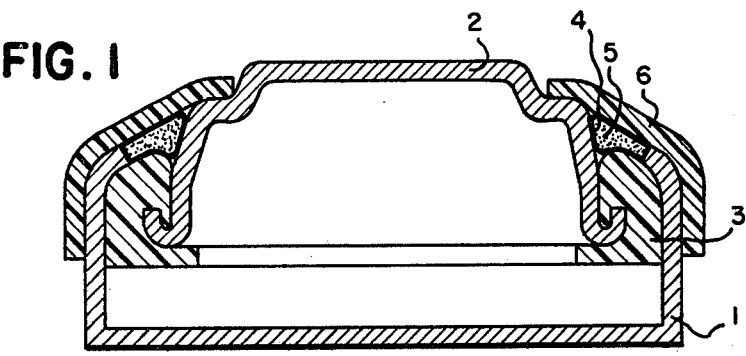
FIG. 1 shows a cross-section of a preferred form of cell housing embodying the present invention.

Referring to FIG. 1, this shows a button cell housing with a ring matting. The sealing region between the housing cup 1 and the lid 2 is filled by the synthetic plastic seal 3. Its upper rim is covered with the annular mat 4 which contains the hydroxide binding material 5. Due to the tension of shrink tubing 6 the annular matting 4 is subjected to sufficient compressive force against the synthetic plastic seal 3.

Figure 2:
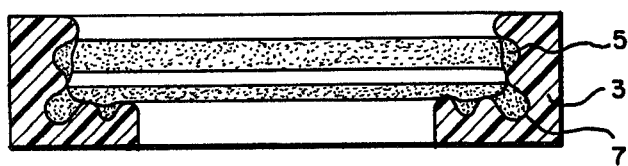
FIG. 2 shows another preferred configuration of the seal.

FIG. 2 shows a preferred embodiment of the seal which resides in that the ring shaped synthetic plastic seal 3 itself is provided on that side of it which faces the rim of the lid with grooves or depressions 7 which contain the hydroxide binding material 5.

Figure 3:
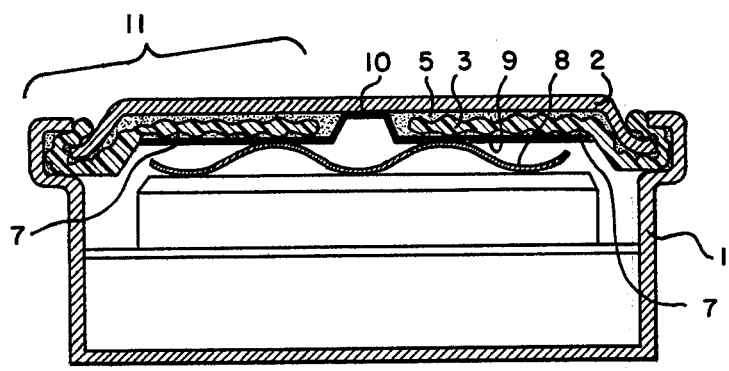
FIG. 3 shows still another embodiment of the invention in cross-section as applied to a particularly extended sealing region.

FIG. 3 shows a button cell which is sealed against electrolyte escape in accordance with the invention and which has an exceptionally extended sealing region. This includes not only the crimped region but extends over the entire interior surface of the lid, whereby in particular the creepage path for the electrolyte is greatly extended.

In addition to the leaf spring 8, this cell is provided with a metallic disk 9 which makes contact with the interior surface of lid 2 by means of a concentric protrusion 10.

Here the synthetic plastic seal 3 is formed as a round plate except for a central opening which is left for the protrusion 10. This round plate is compressed between disk 9 and lid 2 and extends at its edge into the crimped area. Leaf spring 8 provides for the necessary compression of synthetic plastic seal 3. Its upper and lower surfaces are provided with concentrically encircling grooves 7 which are provided with the hydroxide binding material 5 in a manner similar to that in which this is done for synthetic plastic ring 3 in FIG. 2. In addition auxiliary sealing material such as bitumen may be placed in grooves 7. In this manner there exists a sealing region 11 having an extended creepage path. A further embodiment of the invention, not illustrated, involves utilizing, for the placement of the hydroxide binding material, a hollow space present between a miniature button cell and its surrounding second housing, according to the above-mentioned U.S. Pat. No. 3,891,462.

In addition to the above-mentioned boric acid, other solids are also suitable as the hydroxide binding material, provided they exhibit an acidic reaction in an aqueous medium. Examples are the anhydrides of weak inorganic acids such as $B_2O_3$, $As_2O_3$, $As_2O_5$, or the acid salts of multibasic acids such as $NaH_2PO_4$, $Na_2H_2P_2O_7$.

Likewise organic solids with acidic characteristics may be used for the inventive purposes. Examples are ascorbic acid or higher fatty acids.

During reaction of hydroxide which may escape from the cell with the neutralizing solid, there is formed, in addition to water a salt which is hydrolitically decomposed and exhibits alkaline reaction. In any case, however, there is created a diluted hydroxide whose creepage capability is much lower than that of the electrolyte hydroxide in the interior of the cell.

I claim:

1. A galvanic element, particularly a button cell, having an alkaline electrolyte in a metal housing which is sealed in gas-tight manner by means of a synthetic plastic seal between the housing cup and the lid and comprising
   a hydroxide binding material positioned on the side of the sealing region facing away from the electrolyte.

2. The element of claim 1 wherein
   the hydroxide binding material is a water soluble, acidically reacting solid.

3. The element of claim 2 wherein the material is boric acid.

4. The element of claim 2 wherein the material is an acidic alkali salt of a multibasic inorganic acid.

5. The element of claim 2 wherein the material is ascorbic acid.

6. The element of claim 1 wherein the hydroxide binding material is contained within a ring of matting which is positioned on the outer side of the sealing region.

7. The element of claim 6 wherein the ring of matting is covered in liquid-excluding manner.

8. The element of claim 7 wherein the covering is provided by shrink tubing.

9. The element of claim 1 wherein the hydroxide binding material is positioned in grooves which encircle the synthetic plastic seal.

10. The element of claim 9 wherein the synthetic plastic seal extends into a region below the inner surface of the lid.

* * * * *